(12) United States Patent
Monsheimer et al.

(10) Patent No.: US 7,491,792 B2
(45) Date of Patent: Feb. 17, 2009

(54) POLYMER POWDER WITH BLOCK POLYETHERAMIDE, USE IN A SHAPING PROCESS, AND MOLDINGS PRODUCED FROM THIS POLYMER POWDER

(75) Inventors: Sylvia Monsheimer, Haltern am See (DE); Franz-Erich Baumann, Duelmen (DE); Maik Grebe, Bochum (DE); Ulrich Simon, Herne (DE); Sigrid Hessel, Haltern am See (DE)

(73) Assignee: Degussa AG, Duesseldorf (DE)

( * ) Notice: Subject to any disclaimer, the term of this patent is extended or adjusted under 35 U.S.C. 154(b) by 195 days.

(21) Appl. No.: 11/356,416

(22) Filed: Feb. 17, 2006

(65) Prior Publication Data

US 2006/0189784 A1 Aug. 24, 2006

(30) Foreign Application Priority Data

Feb. 19, 2005 (DE) .................. 10 2005 008 044

(51) Int. Cl.
*C08F 6/00* (2006.01)
*C08G 64/00* (2006.01)

(52) U.S. Cl. ............... 528/480; 264/176.1; 264/219; 524/114; 524/166; 524/606; 528/196; 528/198; 528/288

(58) Field of Classification Search ............. 264/176.1, 264/219; 524/114, 166, 606; 528/196, 198, 528/288, 480
See application file for complete search history.

(56) References Cited

U.S. PATENT DOCUMENTS

| | | | |
|---|---|---|---|
| 4,356,300 A | 10/1982 | Isler et al. | |
| 5,296,062 A | 3/1994 | Bourell et al. | |
| 5,405,936 A | 4/1995 | Mumcu et al. | |
| 5,668,242 A | 9/1997 | Simon et al. | |
| 5,932,687 A | 8/1999 | Baumann et al. | |
| 6,060,550 A | 5/2000 | Simon et al. | |
| 6,110,411 A | 8/2000 | Clausen et al. | |
| 6,136,948 A | 10/2000 | Dickens, Jr. et al. | |
| 6,143,852 A | 11/2000 | Harrison et al. | |
| 6,149,836 A | 11/2000 | Mumcu et al. | |
| 6,245,281 B1 | 6/2001 | Scholten et al. | |
| 6,300,413 B1 | 10/2001 | Simon et al. | |
| 6,316,537 B1 | 11/2001 | Baumann et al. | |
| 6,335,101 B1 | 1/2002 | Haeger et al. | |
| 6,579,581 B2 | 6/2003 | Bartz et al. | |
| 6,589,606 B2 | 7/2003 | Waterkamp et al. | |
| 6,656,997 B2 | 12/2003 | Baumann et al. | |
| 6,677,015 B2 | 1/2004 | Himmelmann et al. | |
| 6,766,091 B2 | 7/2004 | Beuth et al. | |
| 6,784,227 B2 | 8/2004 | Simon et al. | |
| 6,884,485 B2 | 4/2005 | Baumann et al. | |
| 2003/0114636 A1 | 6/2003 | Schiffer et al. | |
| 2003/0124281 A1 | 7/2003 | Ries et al. | |
| 2004/0086735 A1 | 5/2004 | Monsheimer et al. | |
| 2004/0097636 A1 | 5/2004 | Baumann et al. | |
| 2004/0102539 A1 | 5/2004 | Monsheimer et al. | |
| 2004/0106691 A1 | 6/2004 | Monsheimer et al. | |
| 2004/0137228 A1 | 7/2004 | Monsheimer et al. | |
| 2004/0138363 A1 | 7/2004 | Baumann et al. | |
| 2004/0140668 A1 | 7/2004 | Monsheimer et al. | |
| 2004/0180980 A1 | 9/2004 | Petter et al. | |
| 2004/0204521 A1 | 10/2004 | Baumann et al. | |
| 2004/0204531 A1 | 10/2004 | Baumann et al. | |
| 2004/0206443 A1 | 10/2004 | Monsheimer et al. | |
| 2004/0232583 A1 | 11/2004 | Monsheimer et al. | |
| 2005/0014842 A1 | 1/2005 | Baumann et al. | |
| 2005/0027047 A1 | 2/2005 | Monsheimer et al. | |
| 2005/0027050 A1 | 2/2005 | Monsheimer et al. | |
| 2005/0038201 A1 | 2/2005 | Wursche et al. | |
| 2006/0189784 A1 | 8/2006 | Monsheimer et al. | |
| 2006/0244169 A1 | 11/2006 | Monsheimer et al. | |

FOREIGN PATENT DOCUMENTS

| | | |
|---|---|---|
| DE | 44 33 118 | 3/1996 |
| DE | 197 47 309 | 4/1999 |
| DE | 10 2004 009 234 A1 | 9/2005 |
| DE | 10 2004 012 682 | 10/2005 |
| DE | 10 2004 012 683 | 10/2005 |
| DE | 10 2004 020 452 | 12/2005 |
| EP | 0 060 579 | 9/1982 |
| EP | 0 290 761 A2 | 11/1988 |
| EP | 0 390 636 A1 | 10/1990 |
| EP | 0 577 348 A2 | 1/1994 |
| EP | 0 610 122 A1 | 8/1994 |

(Continued)

OTHER PUBLICATIONS

U.S. Appl. No. 11/356,416, filed Feb. 17, 2006, Monsheimer et al.

(Continued)

*Primary Examiner*—Terressa M Boykin
(74) *Attorney, Agent, or Firm*—Oblon, Spivak, McClelland, Maier & Neustadt, P.C.

(57) ABSTRACT

Moldings can be produced from a polymer powder containing at least one block polyetheramide containing an oligoamide dicarboxylic acid and a polyetheramine; wherein the powder is suitable for use in a layer-by-layer process in which regions of a powder layer are selectively melted via introduction of electromagnetic energy.

47 Claims, No Drawings

FOREIGN PATENT DOCUMENTS

| | | |
|---|---|---|
| EP | 0 911 142 A1 | 4/1999 |
| WO | WO 95/11006 | 4/1995 |
| WO | WO 96/06881 | 3/1996 |
| WO | WO 98/51464 | 11/1998 |
| WO | WO 01/38061 A1 | 5/2001 |
| WO | WO 2005/109994 A2 | 11/2005 |

OTHER PUBLICATIONS

U.S. Appl. No. 11/241,667, filed Oct. 3, 2005, Monsheimer et al.
U.S. Appl. No. 11/293,360, filed Dec. 5, 2005, Monsheimer et al.
U.S. Appl. No. 11/335,587, filed Jan. 20, 2006, Monsheimer et al.
U.S. Appl. No. 11/354,114, filed Feb. 15, 2006, Dowe et al.
U.S. Appl. No. 11/354,100, filed Feb. 15, 2006, Dowe et al.
U.S. Appl. No. 10/565,779, filed Jan. 25, 2006, Monsheimer et al.
U.S. Appl. No. 11/484,593, filed Jul. 12, 2006, Monsheimer et al.
U.S. Appl. No. 11/480,459, filed Jul. 5, 2006, Dowe et al.
U.S. Appl. No. 10/590,935, filed Aug. 28, 2006, Monsheimer et al.
U.S. Appl. No. 10/592,952, filed Sep. 15, 2006, Monsheimer et al.
U.S. Appl. No. 11/561,021, filed Nov. 17, 2006, Simon et al.
U.S. Appl. No. 11/587,795, filed Oct. 27, 2006, Monsheimer et al.
U.S. Appl. No. 11/587,758, filed Oct. 27, 2006, Baumann et al.
U.S. Appl. No. 11/596,365, filed Nov. 14, 2006, Monsheimer et al.
U.S. Appl. No. 11/694,129, filed Mar. 30, 2007, Monsheimer et al.
U.S. Appl. No. 11/671,820, filed Feb. 6, 2007, Monsheimer et al.
U.S. Appl. No. 12/105,672, filed Apr. 18, 2008, Simon et al.

POLYMER POWDER WITH BLOCK POLYETHERAMIDE, USE IN A SHAPING PROCESS, AND MOLDINGS PRODUCED FROM THIS POLYMER POWDER

BACKGROUND OF THE INVENTION

1. Field of the Invention

The present invention relates to a polymer powder containing block polyetheramide based on an oligoamide dicarboxylic acid and on polyetheramines, preferably based on an oligoamide dicarboxylic acid and on polyetherdiamines, to the use of this powder in shaping processes, and also to moldings produced via a layer-by-layer process by which regions of a powder layer are selectively melted, using this powder.

2. Description of the Related Art

A task arising frequently in very recent times is rapid provision of prototypes. Particularly suitable processes are those whose operation is based on pulverulent materials and in which the desired structures are produced layer-by-layer via selective melting and hardening. Support structures for overhangs and undercuts can be omitted in these processes because the powder bed surrounding the molten regions provides sufficient support. The subsequent work of removing supports is also omitted. The processes are also suitable for short-run production.

An example of a selectivity method for the layer-by-layer processes here can be the application of susceptors, of absorbers, or of inhibitors, or the use of masks or the use of focused energy introduction, for example via a laser beam, or by way of glass fibers. Energy introduction is achieved by way of electromagnetic radiation.

Descriptions are given below of some processes with which moldings of the present invention can be produced from the powder of the present invention, but there is no intention that the present invention be restricted thereto.

One process which has particularly good suitability for the purposes of rapid prototyping is selective laser sintering. In this process, plastics powders in a chamber are selectively and briefly irradiated with light from a laser beam, the result being that the powder particles impacted by the laser beam are melted. The molten particles coalesce and rapidly solidify again to give a solid mass. Three-dimensional bodies can be simply and rapidly produced by this process via repeated irradiation of fresh layers repeatedly applied.

The patent specifications U.S. Pat. No. 6,136,948 and WO 96/06881 (both DTM Corporation) describe in detail the process of laser sintering (rapid prototyping) to produce moldings from pulverulent polymers. A wide variety of polymers and of copolymers is claimed for this use, examples being polyacetate, polypropylene, polyethylene, ionomers, and polyamide.

Other processes with good suitability are the SIB process as described in WO 01/38061, or a process as described in EP 1 015 214. Both processes operate with full-surface infrared heating to melt the powder. The selectivity of melting is achieved in the first process via application of an inhibitor, and in the second process via a mask. DE 103 11 438 describes another process. In this, the energy needed for the melting process is introduced via a microwave generator, and the selectivity is achieved via application of a susceptor.

Other suitable processes are those that operate with an absorber, either present within the powder or applied via ink jet methods, as described in DE 10 2004 012 682.8, DE 10 2004 012 683.6, and DE 10 2004 020 452.7.

The rapid prototyping processes or rapid manufacturing processes (RP processes or RM processes) can use pulverulent substrates, in particular polymers, preferably selected from polyester, polyvinyl chloride, polyacetal, polypropylene, polyethylene, polystyrene, polycarbonate, poly(N-methylmethacrylimides) (PMMI), polymethyl methacrylate (PMMA), ionomer, polyamide, or mixtures thereof.

U.S. Pat. No. 6,110,411 describes, specifically for laser sintering, powders of block copolymers which are comprise a hard segment and of a soft segment, where the hard block can comprise a polyamide unit, but the soft block comprises another component, namely of ether units and of ester units. The structure of the soft segments is described generally via the formulae (1) or (2):

in which R is the radical of a dicarboxylic acid and G and, respectively, D is that radical of a glycol and, respectively, long-chain diol/polyetherdiol which remains after abstraction of the terminal hydroxy groups. The suitability, mentioned in the same publication, of polyether block amides of the PEBAX® series likewise refers to polyamide elastomers in which polyether segments and aliphatic polyamide segments have been linked to one another via ester groups.

The powders described above moreover have to comprise a powder-flow aid and have to have a glass transition temperature below 50° C. However, there is no feasible method based on polyamides for preparing stable block copolymers with a defined structure, with the exception of the polyetheresteramides (PEBA) included in the cited application and of the polyetheramines (PEA) not included in the cited application. Transamidation reactions usually occur in the melt comprising polyamides, until random distribution of the monomers has been reestablished.

DE 44 33 118 considers polymer blends. However, a blend is a mixture prepared from two or more polymers under defined conditions of temperature and shear, and usually processed to give pellets. In this process, the individual polymer chains are mixed with one another ("intermolecularly"), but no combination of the starting components occurs within one chain (for an example of a definition see Sächtling Kunststofftaschenbuch [Plastics Handbook], 24th edition, pp. 7 et seq.).

EP 0 060 579 A1 describes a polyetheramine in combination with a nylon 6 or 6,6. The solution viscosity of the copolymers considered is from 2 to 3.5. Due to increased water absorption, the material is unsuitable for the moldless production processes described above, and is impossible or very difficult to grind.

U.S. Pat. No. 5,296,062 treats powders with markedly different melting points. The main use is the adhesive-bonding of a relatively high-melting metal component to a component which comprises metal or of plastic and which has a lower melting point. The particles here may be present adjacent to one another, or the lower-melting-point component is applied as a coating to the other component. No homogeneous mixture within a powder particle is involved.

U.S. Pat. No. 6,143,852 describes a copolymer which comprises methyl methacrylate with C2-C10 alkyl methacrylate, and which is obtained via dispersion polymerization. This gives very small particles and a very narrow grain size distribution. However, the poor flowability of small particles makes them relatively unsuited to laser sintering; a narrow grain distribution such as that described leads to more difficult processing in a layer-by-layer process in which regions are melted selectively, specifically by virtue of narrow processing latitude, which in the extreme case can result in unsuitability.

WO 95/11006 describes a polymer powder suitable for the laser sintering process and exhibiting no overlap of the melting peak and recrystallization peak when melting behavior is determined via differential scanning calorimetry at a scanning rate of from 10 to 20° C./min, having a degree of crystallinity of from 10 to 90%, likewise determined via DSC, a number-average molecular weight Mn of from 30,000 to 500,000, and a Mw/Mn quotient in the range from 1 to 5.

DE 197 47 309 describes the use of a nylon 12 powder with increased melting point and increased enthalpy of fusion, obtained via re-precipitation of a polyamide previously prepared via ring-opening and subsequent polycondensation of laurolactam. This is a nylon 12.

A disadvantage of known components is poor impact resistance. This is similarly poor to that found in injection-molded polyamide components. Particularly if the intended use extends beyond the prototyping process, an example being small runs, good impact resistance of the components is essential, however. In the case of use in the automotive sector, components also have to retain adequate impact resistances even at low temperatures.

Another disadvantage is that impact-resistance modification methods found for granular materials cannot be transferred to pulverulent materials. Appropriately modified compound materials are generally not grindable, or only with yields which do not permit commercial use.

SUMMARY OF THE INVENTION

It was therefore an object of the present invention to provide a polymer powder which permits production of impact-resistant moldings using a processing method of maximum reproducibility.

It is another object of the present invention to provide a polymer powder which can be used in a processing method in which a layer-by-layer process is used in which regions of the respective powder layer are selectively melted by means of electromagnetic energy, and, after cooling, have become bonded to give the desired molding.

This and other objects have been achieved by the present invention the first embodiment of which includes a polymer powder, comprising:

at least one block polyetheramide comprising an oligoarnide dicarboxylic acid and a polyetheramine;

wherein said powder is suitable for use in a layer-by-layer process in which regions of a powder layer are selectively melted via introduction of electromagnetic energy.

In another embodiment, the present invention provides a process for production of a molding, comprising:

via a layer-by-layer process selectively melting regions of a respective powder layer of a powder by introduction of electromagnetic energy, wherein the selectivity is achieved via application of a susceptor, an inhibitor, an absorber, or a mask, wherein said powder comprises at least one block polyetheramide comprising an oligoamide dicarboxylic acid and a polyetheramine.

In yet another embodiment, the present invention provides a molding, produced by the above process.

DETAILED DESCRIPTION OF THE INVENTION

Surprisingly, it has now been found that the use of block polyetheramide based on oligoamide dicarboxylic acids and on polyetheramines, preferably on polyetherdiamines, makes it possible, for example via polycondensation and subsequent grinding, to prepare polymer powders from which it is possible to produce, via a layer-by-layer process in which regions of the respective powder layer are selectively melted, moldings which have advantages in terms of impact resistance, even at low temperatures, while their processing properties and mechanical properties are good and comparable with those derived from a polymer powder, for example as in DE 197 47 309.

The present invention therefore provides a polymer powder for processing in a layer by layer process in which regions of the respective layer are selectively melted, which comprises at least one block polyetheramide comprising oligoamide dicarboxylic acids and polyetheramines, preferably one block polyetheramide prepared via polycondensation of oligoamide dicarboxylic acids and of polyetherdiamines.

This block polyetheramide powder of the present invention has a melting point of from 140 to 200° C., an enthalpy of fusion of from 15 to 100 J/g, and a recrystallization temperature of from 50 to 190° C. The recrystallization temperature is preferably as low as possible. The melting point includes all values and subvalues therebetween, especially including 145, 150, 155, 160, 165, 170, 175, 180, 185, 190 and 195° C. The enthalpy of fusion includes all values and subvalues therebetween, especially including 20, 30, 40, 50, 60, 70, 80 and 90 J/g. The recrystallization temperature includes all values and subvalues therebetween, especially including 60, 70, 80, 90, 100, 110, 120, 130, 140, 150, 160, 170 and 180° C.

The various parameters were determined by means of DSC (differential scanning calorimetry) to DIN 53765, or to AN SAA 0663. The measurements were carried out using a Perkin Elmer DSC 7 with nitrogen as flushing gas and with a heating rate and cooling rate of 20 K/min.

The BET surface area of the block polyetheramide powder of the present invention is smaller than 5 $m^2/g$, preferably smaller than 3 $m^2/g$, and particularly preferably smaller than 2 $m^2/g$. The average grain diameter is preferably from 40 to 120 μm, preferably from 45 to 100 μm, and particularly preferably from 50 to 70 μm. The average grain diameter includes all values and subvalues therebetween, especially including 50, 60, 70, 80, 90, 100 and 110 μm. The grain distribution can be narrow, broad, or else bimodal. The grain size range is from 0 to 180 μm, preferably from 0 to 120 μm, and particularly preferably from 0 to 100 μm. The grain size range includes all values and subvalues therebetween, especially including 10, 20, 30, 40, 50, 60, 70, 80, 90, 100, 110, 120, 130, 140, 150, 160 and 170 μm. The bulk density is from 300 g/l to 550 g/l (without fillers). The bulk density includes all values and subvalues therebetween, especially including 310, 320, 330, 340, 350, 360, 370, 380, 390, 400, 410, 420, 430, 440, 450, 460, 470, 480, 490, 500, 510, 520, 530 and 540 g/l.

The BET surface area is determined via gas adsorption using the Brunauer, Emmet and Teller principle; the standard utilized is DIN ISO 9277.

The solution viscosity is determined here on the polyamide to DIN EN ISO 307 in 0.5% strength m cresol solution.

The bulk density was determined using an apparatus to DIN 53 466.

The values measured for laser diffraction were determined on a Malvern Mastersizer S, Ver. 2.18.

The present invention also provides moldings produced via a layer-by-layer process which selectively melts regions of the respective layer, which comprise at least block polyetheramide comprising oligoamide dicarboxylic acids and polyetheramines, preferably a block polyetheramide comprising oligoamide dicarboxylic acids and polyetherdiamines, and, if appropriate, comprise other additives, e.g. stabilizers, fillers, pigments, flow agents and powder-flow aids.

An advantage of the block polyetheramide powder of the present invention is that moldings produced therefrom via a layer-by-layer process in which regions of the respective layer are selectively melted, have increased impact resistance when compared with moldings comprising conventional polyamide powders. When this powder of the present invention is compared with conventional polyamide powder it has comparable processing reliability. The grinding process is markedly easier and the yields are higher than during grinding of a comparative PEBA which comprises polyetherester.

These moldings produced from the powder of the present invention have good mechanical properties similar to those of moldings produced from conventional nylon 12 powder. In comparison with the latter, they have markedly improved notched impact resistance to ISO 179 1 eA, in particular at low temperatures. There is also mostly an increase in tensile strain at break. In contrast, the modulus of elasticity can be in the range of the standard material, or else markedly below that range. It can be adjusted via the constitution of the block polyetheramide. Controlled adjustment for very flexible components produced from polymer powder of the present invention by an process of the present invention is therefore possible, as also is production of relatively hard and impact-resistant components, measurements being based on standard PA12 polymer powder. In one preferred embodiment, amine-terminated block polyetheramides are used, the result being a further improvement in mechanical properties of the components.

A feature of the block polyetheramide powder of the present invention for processing in a layer-by-layer process in which regions of the respective layer are selectively mounted is that the powder comprises at least one block polyetheramide comprising oligoamide dicarboxylic acids and polyetheramines, preferably one block polyetheramide comprising oligoamide dicarboxylic acids and polyetherdiamines. Polyetheramides and their preparation are known in principle from DE A 030 06 961.

To prepare the block polyetheramide polyetheramine and the polyamide-forming starting materials are charged to a suitable polycondensation reactor, such as known reactors. The components here may be added simultaneously or else at different times. The components are heated under nitrogen, with stirring, and then kept for as long as necessary if appropriate in vacuo with heating. Once the desired quality has been achieved, the polymer is discharged from the reactor and during this process is strand-pelletized. The pellets may then be dried, if appropriate under nitrogen.

Block polyetheramide powder of the present invention is obtained via grinding, preferably at low temperatures, particularly preferably at below 0° C. and very particularly preferably at below −25° C., using a block polyetheramide comprising oligoamide dicarboxylic acids and polyetheramines, preferably polyetherdiamines, as starting material. Pinned-disk mills, fluidized-bed opposed-jet mills, or baffle-plate impact mills are suitable, inter alia, for the grinding process. Post treatment in a mixer with severe shear, preferably at temperatures above the glass transition temperature of the polymer, can follow in order to round the grains and therefore improve powder-flow properties. Fractionation, for example via sieving or sifting, can improve the properties of the powder. Another process which may follow is addition of powder-flow aids. Surprisingly, these measures can produce a powder which has good processability and which permits reliable and commercially useful processing by an process of the present invention.

Surprisingly, it has been found that the disadvantages, in particular the poor grindability, of impact-modified pellets, are not exhibited by powder using the block polyetheramide of the present invention comprising oligoamide dicarboxylic acids and polyetheramines. Grinding is readily possible at low temperatures, and the yields here are within the commercially useful range. Components whose notched impact resistance to ISO 179 1 eA at room temperature, and also at 30° C., is more than 15 kJ/m$^2$, preferably more than 25 kJ/m$^2$ can be produced here during processing in one of the moldless production processes described.

The modulus of elasticity here can be from 50 N/mm$^2$ to more than 2000 N/mm$^2$. The modulus of elasticity includes all values and subvalues therebetween, especially including—As a function of constitution, a very flexible material can be produced here, for example with a modulus of elasticity of from 50 to 600 N/mm$^2$ to ISO 527 measured on a tensile specimen produced from the material by an process of the present invention, or a material with relatively high stiffness can be produced, for example with a modulus of elasticity of from 600 to 2000 N/mm$^2$ to ISO 527, measured on a tensile specimen produced from the material by an process of the present invention. The modulus of elasticity of a flexible material includes all values and subvalues therebetween, especially including 100, 150, 200, 250, 300, 350, 400, 450, 500 and 550 N/mm$^2$. The modulus of elasticity of the relatively stiff material includes all values and subvalues therebetween, especially including 700, 800, 900, 1000, 1100, 1200, 1300, 1400 1500, 1600, 1700, 1800 and 1900 N/mm$^2$. The density of the components produced by an process of the present invention here is more than 0.88 g/cm$^3$, preferably more than 0.9 g/cm$^3$, and particularly preferably more than 0.92 g/cm$^3$.

The polyetheramines used have primary amino groups and a backbone comprising polyether units. The polyether backbone may, by way of example, comprise propylene oxide, ethylene oxide, polytetramethylene oxide, or a mixture comprising two or all of the abovementioned. The individual ether units preferably have alkyl branching. The polyetheramines can be mono, di or triamines, particular preference being given to diamines. The molar mass (weight-average) is from 200 to 5000 g/mol. The weight average molar mass includes all values and subvalues therebetween, especially including 500, 1000, 1500, 2000, 2500, 3000, 3500, 4000 and 4500 g/mol. The polyetheramines form the soft block in the copolymer.

Commercially available products are the polyetheramines of the D series from BASF AG, Germany, for example POLY-ETHERAMINE D400, and also the JEFFAMINE series from Huntsman Corp., Texas, for example JEFFAMINE D2000.

The molar mass of the oligoamide dicarboxylic acids used is from 1000 to 20000 g/mol. The molar mass includes all values and subvalues therebetween, especially including 2000, 4000, 6000, 8000, 10000, 12000, 14000, 16000 and 18000 g/mol. The oligoamide dicarboxylic acids form the hard block in the copolymer. For the soft formulations, the selected length of the hard block is preferably below 1500 g/mol, and for the hard formulations the length of the hard block is preferably more than 5000 g/mol; both of these data are based on the use of a linear diamine-terminated polyether.

By way of example, the oligoamide dicarboxylic acid is obtained from laurolactam or from another lactam having 8 or more carbon atoms, or from the corresponding ω-aminocarboxylic acids and from a dicarboxylic acid, preferably from a linear aliphatic dicarboxylic acid, particularly preferably dodecanedioic acid. Oligoamide dicarboxylic acids comprising aliphatic diamines with an excess of aliphatic dicarboxylic acid may also be condensed with the polyetheramines mentioned.

In the polycondensation reaction, it is advantageous to add a catalyst, such as hypophosphorous acid. It is also possible to add stabilizers and costabilizers; sterically hindered phenols or phosphites may be mentioned by way of example. The solution viscosity of the block polyetheramide is adjusted by way of the process and the addition of the catalyst and can be from 1.4 to 2.1, preferably from 1.5 to 1.9, and particularly preferably from 1.6 to 1.8. The solution viscosity of the block polyetheramide includes all values and subvalues therebetween, especially including 1.5, 1.6, 1.7, 1.8, 1.9, 2.0. The polycondensation reaction gives a block polyetheramide, the polyamide component forming the hard block and the polyetheramine component forming the soft block. Depending on the proportions of the two components added in the reactor, the material obtained has an excess of amino end groups or of acid end groups, or else is a material with the same number of the two end groups. The block polyetheramide preferably has an excess of amino end groups. The number of amino end groups should not differ by more than 10% from the number of carboxy end groups.

The melting point of this block polyetheramide powder of the present invention is from 140 to 200° C., its enthalpy of fusion is from 15 to 100 J/g, and its recrystallization temperature is from 50 to 190° C. The recrystallization temperature is preferably as low as possible. The melting point includes all values and subvalues therebetween, especially including 145, 150, 155, 160, 165, 170, 175, 180, 185, 190 and 195° C. The enthalpy of fusion includes all values and subvalues therebetween, especially including 20, 30, 40, 50, 60, 70, 80, 90 J/g. The recrystallization temperature includes all values and subvalues therebetween, especially including 60, 70, 80, 90, 100, 110, 120, 130, 140, 150, 160, 170 and 180° C.

The glass transition depends on the respective polyetheramine and, when a linear polyetheramine is used whose molar mass is about 2000 g/mol, is 60° C. for example, and when a linear polyetheramine is used whose molar mass is about 400 g/mol is about 12° C., for example. Depending on the length of the polyamide hard block, a second glass transition is often found, lying below that of the pure corresponding polyamide. By way of example, in the case of hard blocks smaller than 2000 g/mol there is mostly no second glass transition to be found, but in the case of hard blocks comprising laurolactam and dodecanedioic acid and larger than 2500 g/mol a glass transition at about 27° C. can be observed, and with rising hard block length moves in the direction of the glass transition of the pure polyamide, in this case 38° C. for nylon-12.

For specific formulation of hard material which can produce components whose notched impact resistance to ISO 179 1 eA is greater than 10 kJ/m$^2$ even at temperatures of −30° C. and whose modulus of elasticity to ISO 527 is simultaneously greater than 600 N/mm$^2$, there is an advantageous embodiment in the division of the polyetheramine fraction into polyetheramines of different molar mass. A preferred embodiment here has proven to be a 1:1, 2:1, or 1:2 division of the polyetheramine fraction with molar mass from 400 g/mol to 2000 g/mol.

The BET surface area of the block polyetheramide powder of the present invention according to the principle of Brunauer, Emmet, Teller, DIN ISO 9277, is smaller than 5 m$^2$/g, preferably smaller than 3 m$^2$/g, and particularly preferably smaller than 2 m$^2$/g. The average grain diameter is preferably from 40 to 120 µm, preferably from 45 to 100 µm, and particularly preferably from 50 to 70 µm. The grain size ranges from 0 to 180 µm, preferably from 0 to 120 µm, and particularly preferably from 0 to 100 µm. The grain size includes all values and subvalues therebetween, especially including 10, 20, 30 40, 50, 60, 70, 80, 90, 100, 110, 120, 130, 140, 150, 160 and 170 µm. The grain size distribution can be narrow, broad, or else bimodal. The bulk density is from 300 g/l to 500 g/l (without fillers). The bulk density includes all values and subvalues therebetween, especially including 320, 340, 360, 380, 400, 420, 440, 460 and 480 g/l.

The solution viscosity of the block polyetheramide powders of the present invention in 0.5% strength m cresol solution to DIN EN ISO 307 is preferably from 1.4 to 2.1, particularly preferably from 1.5 to 1.9, and very particularly preferably from 1.6 to 1.8. The solution viscosity of the block polyetheramide powders includes all values and subvalues therebetween, especially including 1.5, 1.6, 1.7, 1.8, 1.9, and 2.0.

Block polyetheramide powder of the present invention can moreover comprise auxiliaries and/or fillers and/or other organic or inorganic pigments. By way of example, these auxiliaries may be powder-flow aids, e.g. precipitated and/or fumed silicas. Examples of precipitated silicas are available for purchase with the product name Aerosil, with various specifications, from Degussa AG. Polymer powder of the present invention preferably comprises less than 3% by weight, preferably from 0.001 to 2% by weight, and very particularly preferably from 0.05 to 1% by weight, of these auxiliaries, based on the entirety of the polymers present. The amount of auxiliary includes all values and subvalues therebetween, especially including 0.005, 0.01, 0.05, 0.1, 0.5, 1, 1.5% by weight. The fillers may, by way of example, be glass particles, metal particles, or ceramic particles, e.g. glass beads, steel shot, or metal granules, or foreign pigments, e.g. transition metal oxides. The pigments may, by way of example, be titanium dioxide particles based on rutile (preferably) or anatase, or carbon black particles.

The average particle size of these filler particles is preferably smaller or approximately the same as that of the particles of the block polyetheramides. The average particle size $d_{50}$ of the fillers should preferably be no more than 20%, preferably no more than 15%, and very particularly preferably no more than 5%, greater than the average particle size $d_{50}$ of the block polyetheramides. A particular limit on the particle size arises via the permissible overall height and, respectively, layer thickness in the rapid prototyping/rapid manufacturing system.

The amount of these fillers present in polymer powder of the present invention is preferably less than 75% by weight, preferably from 0.001 to 70% by weight, particularly preferably from 0.05 to 50% by weight, and very particularly preferably from 0.5 to 25% by weight, based on the entirety of the block polyetheramides present. The amount of these fillers includes all values and subvalues therebetween, especially including 0.005, 0.01, 0.05, 0.1, 0.5, 1, 5, 10, 15, 20, 25, 30, 35, 40, 45, 50, 55, 60, 65% by weight.

If the stated maximum limits for auxiliaries and/or fillers are exceeded, the result, depending on the filler or auxiliary used, can be marked impairment of the mechanical properties of moldings produced by means of these polymer powders.

It is also possible to mix conventional polymer powders with polymer powders of the present invention. This method can produce polymer powders within a wide range of flexibility and impact resistance. The process for preparation of these mixtures can be found in DE 34 41 708, by way of example.

In order to improve melt flow during production of the moldings, a flow agent may be added to the block polyetheramide powder, examples being metal soaps, preferably the alkali metal or alkaline earth metal salts of the underlying alkanemonocarboxylic acids or dimer acids. The metal soap particles may be incorporated into the polymer particles, or else mixtures of fine-particle metal soap particles and polymer particles may be present.

The amounts used of the metal soaps are from 0.01 to 30% by weight, preferably from 0.5 to 15% by weight, based on the entirety of the block polyetheramides present in the powder. The amounts used of the metal soaps includes all values and subvalues therebetween, especially including 0.05, 0.1, 0.5, 1, 5, 10, 15, 20, 25% by weight. Metal soaps preferably used were the sodium or calcium salts of the underlying alkanemonocarboxylic acids or dimer acids. Examples of commercially available products are LICOMONT NaV 101 or LICOMONT CaV 102 from CLARIANT.

For improvement of processibility or for further modification of the polymer powder, this powder may receive additions of inorganic foreign pigments, e.g. transition metal oxides, of stabilizers, e.g. phenols, in particular sterically hindered phenols, of flow agents and powder-flow aids, e.g. fumed silicas, or else filler particles. The amount of these substances added to the polymers, based on the total weight of polymers in the polymer powder, is preferably such as to comply with the concentrations stated for fillers and/or auxiliaries for the polymer powder of the present invention.

The present invention also provides processes for production of moldings via layer-by-layer processes in which regions of the respective layer are selectively melted, and the polymer powders of the present invention, which comprise at least one block polyetheramide comprising an oligoamide dicarboxylic acid and a polyetheramine, preferably polyetherdiamine.

The energy is introduced via electromagnetic radiation, and the selectivity is achieved, by way of example, via masks, application of inhibitors, of absorbers, or of susceptors, or else via focusing of the radiation, for example via lasers. The electromagnetic radiation encompasses the range from 100 nm to 10 cm, preferably from 400 nm to 10 600 nm, and particularly preferably 10 600 nm (CO2 laser) or from 800 to 1060 nm (diode laser, Nd:YAG laser, or appropriate lamps and sources). Examples of the source of the radiation may be a microwave generator, a suitable laser, a radiant heater, or a lamp, or else combinations thereof. Once all of the layers have been cooled, the molding of the present invention can be removed. It can be advantageous to control the temperature of the construction chamber of the machine.

The following examples of these processes serve for illustration, but there is no intention that the present invention be restricted thereto.

Laser sintering processes are well known and are based on the selective sintering of polymer particles, layers of polymer particles being briefly exposed to laser light, the result being that the polymer particles exposed to the laser light become bonded to one another. Successive sintering of layers of polymer particles produces three-dimensional objects. Details of the selective laser sintering process can be found by way of example in U.S. Pat. No. 6,136,948 and WO 96/06881.

The powder of the present invention can also be used for processing in an process of the present invention in which different powders are used from layer to layer or else within one layer. By way of example, this method can produce a molding which has hard and soft regions.

Other processes with good suitability are the SIB process as described in WO 01/38061, or a process as described in EP 1 015 214. Both processes operate with full-surface infrared heating to melt the powder. Selectivity of melting is achieved in the former via application of an inhibitor, and in the second process via a mask. Another process is described in DE 103 11 438. In this, the energy needed for fusion is introduced via a microwave generator, and the selectivity is achieved via application of a susceptor.

Other suitable processes are those which operate with an absorber, which is either present within the powder or is applied by ink jet processes, as described in DE 10 2004 012 682.8, DE 10 2004 012 683.6, and DE 10 2004 020 452.7.

In order to achieve ideal results, the block polyetheramine powder and the process used must be matched to one another. For example, for powder application systems which use gravity it can be advantageous to increase the free flow of the powder with suitable measures known to the person of skill in the art. Preheating of the construction chamber, or else of the powder, can be advantageous for processibility and for component quality. Good results have also been achieved by introducing a different, mostly higher, level of energy into the first layers of a component than into the following layers. No comprehensive list is given here of the wide variety of possible settings of, for example, power, exposure time, and frequency of electromagnetic radiation; however, they can easily be determined in preliminary experiments by the person skilled in the art.

A feature of the moldings of the present invention produced by a layer-by-layer process in which regions are selectively melted is that they comprise at least one block polyetheramide and one oligoamide dicarboxylic acid, the block polyetheramide being comprising a polyetheramine, preferably polyetherdiamine.

The moldings may moreover comprise fillers and/or auxiliaries (the data given for the polymer powder being applicable here), examples being heat stabilizers, for example sterically hindered phenol derivatives. Examples of fillers may be glass particles, ceramic particles, and also metal particles, e.g. iron shot, or corresponding hollow beads. The moldings of the present invention preferably comprise glass particles, very particularly preferably glass beads. Moldings of the present invention preferably comprise less than 3% by weight, particularly preferably from 0.001 to 2% by weight, and very particularly preferably from 0.05 to 1% by weight, of these auxiliaries, based on the entirety of the polymers present. The amount of auxiliary includes all values and subvalues therebetween, especially including 0.005, 0.01, 0.05, 0.1, 0.5, 1, 1.5% by weight. Moldings of the present invention also preferably comprise less than 75% by weight, preferably from 0.001 to 70% by weight, particularly preferably from 0.05 to 50% by weight, and very particularly preferably from 0.5 to 25% by weight, of these fillers, based on the entirety of the polymers present. The amount of filler includes all values and subvalues therebetween, especially including .005, 0.01, 0.05, 0.1, 0.5, 1, 5, 10, 15, 20, 25, 30, 35, 40, 45, 50, 55, 60, 65% by weight.

A feature of the moldings of the present invention is very good impact resistance and, respectively, notched impact resistance, especially at low temperatures. For example, notched impact resistances to DIN EN ISO 179 1 eA of 15 $kJ/m^2$ are achievable without difficulty both at room temperature and also 30° C., as also are values of more than 20 $kJ/m^2$, or even more than 40 $kJ/m^2$, depending on the constitution of the block polyetheramide. As long as the components do not have an excessive number of cavities, or have a density greater than 0.9 $g/mm^3$, it can be observed that the notched impact resistances at 30° C. are indeed higher than at room temperature. The tensile strain at break values to ISO 527 are generally above 30%, but the values measured are mostly markedly higher than that.

The solution viscosity measured on the component of the present invention in 0.5% strength m cresol solution to DIN EN ISO 307 can be within the range from 20% lower to 50% higher than the solution viscosity measured on the block polyetheramine powder used. It is preferably in the range from 10% lower to 30% higher than the solution viscosity of the block polyetheramine powder used. The solution viscosity includes all values and subvalues therebetween, especially including 15% lower, 10% lower, 50% lower, equal to, 5% lighter, 10% lighter, 15% lighter, 20% lighter, 25% lighter, 30% lighter, 35% lighter, 40% lighter, and 45% lighter than the solution viscosity measured on the block polyetheramine powder used. A rise in solution viscosity particularly preferably takes place during the construction process of the present invention.

The modulus of elasticity measured on the molding of the present invention can be from 50 N/mm$^2$ to more than 2000 N/mm$^2$. The modulus of elasticity includes all values and subvalues therebetween, especially including 100, 200, 300, 400, 500, 600, 700, 800, 900, 1000, 1100, 1200, 1300, 1400, 1500, 1600, 1700, 1800 and 1900 N/mm$^2$. Depending on the constitution of the block polyetheramine powder used, a very flexible molding can be produced here, for example with a modulus of elasticity of from 50 to 600 N/mm$^2$ to ISO 527, measured on a tensile specimen produced therefrom by an process of the present invention, or a molding with relatively high stiffness can be produced, for example with a modulus of elasticity of from 600 to 2000 N/mm$^2$ to ISO 527 measured on a tensile specimen produced therefrom by an process of the present invention. The modulus of elasticity of the flexible molding includes all values and subvalues therebetween, especially including 100, 150, 200, 250, 300, 350, 400, 450, 500 and 550 N/mm$^2$. The modulus of elasticity of the stiff molding includes all values and subvalues therebetween, especially including 700, 800, 900, 1000, 1100, 1200, 1300, 1400, 1500, 1600, 1700, 1800 and 1900 N/mm$^2$. The density of the components produced by an process of the present invention here is more than 0.88 g/mm$^3$, preferably more than 0.9 g/mm$^3$, and particularly preferably more than 0.92 g/mm$^3$.

Possible application sectors for these moldings are in both rapid prototyping and rapid manufacturing. The latter certainly means short runs, i.e. production of more than one identical part, for which, however, production by means of an injection mold is uneconomic. Examples here are parts for high-specification cars produced only in small numbers of units, or replacement parts for motor sports where significant factors are not only the small numbers of units but also the availability time. Possible sectors using the parts of the present invention are the aerospace industry, medical technology, mechanical engineering, automotive construction, the sports industry, the household goods industry, the electrical industry, and lifestyle products.

Having generally described this invention, a further understanding can be obtained by reference to certain specific examples which are provided herein for purposes of illustration only, and are not intended to be limiting unless otherwise specified.

EXAMPLES

Comparative Example 1

EOSINT PPA2200, standard material for laser sintering which can be purchased by way of example from EOS GmbH in Krailling, Germany.

Comparative Example 2

To prepare a PEBA based on PA12 with hard block of 1062 daltons and equimolar amounts of PTHF 1000 and PTHF 2000, the following starting materials were supplied to a 200 l double-tank polycondensation system—comprising mixing vessel with anchor stirrer and polycondensation reactor with helical stirrer:
1st charge:
34.418 kg of laurolactam,
8.507 kg of dodecanedioic acid, and
2nd charge
38.050 kg of PTHF 2000,
19.925 kg of PTHF 1000
43.0 g of a 50% strength aqueous solution of hypophosphorous acid (corresponding to 0.05% by weight).

The starting materials of the 1 st charge were melted in a nitrogen atmosphere at 180° C., injected into the polycondensation reactor, and heated, with stirring, to about 280° C. for 6 hours in the sealed autoclave. During this process, the 2nd charge was preheated to 180° C. in the mixing vessel and injected into the oligoamide dicarboxylic acid melt in the polycondensation reactor. After depressurization to atmospheric pressure, this mixture is kept for about 5 hours at 238° C. in the stream of nitrogen, with stirring at this temperature. A vacuum of 200 mbar was then applied within a period of 3 hours and maintained until the desired torque had been achieved. The melt was then subjected to a nitrogen pressure of 10 bar and discharged by means of a gear pump, and strand-pelletized. The pellets were dried at 80° C. under nitrogen for 24 hours.
Yield: 96 kg
The properties of the product were as follows:
Crystallite melting point $T_m$: 150° C.
Relative solution viscosity $\eta_{rel}$: 2.12
COOH end groups: 43 mmol/kg

Comparative Example 3

A standard product from Degussa AG, Marl, Germany, namely VESTAMID E40 S3, is ground at low temperature. This is a polyetherester-block-amide having a soft block comprising polytetrahydrofuran 1000 and having Shore hardness of 40 D.

Comparative Example 4

A standard product from Degussa AG, Marl, Germany, namely VESTAMID E55 S3, is ground at low temperature. This is a polyetherester-block-amide having a soft block composed of polytetrahydrofuran 1000 and having Shore hardness of 55 D.

Example 1

To prepare a PEA based on PA12 having a hard block of 2392 daltons and JEFFAMINE D2000, the following starting materials were supplied to a 200 l double-tank polycondensation system—composed of mixing vessel with anchor stirrer and polycondensation reactor with helical stirrer:

1st charge:
45.186 kg of laurolactam,
4.814 kg of dodecanedioic acid, and
2nd charge
43.060 kg of JEFFAMINE D2000,
93.0 g of a 50% strength aqueous solution of hypophosphorous acid (corresponding to 0.05% by weight).

The starting materials of the 1 st charge were melted in a nitrogen atmosphere at 180° C., injected into the polycondensation reactor, and heated, with stirring, to about 280° C. for 6 hours in the sealed autoclave. During this process, the 2nd charge was preheated to 180° C. in the mixing vessel and injected into the oligoamide dicarboxylic acid melt in the polycondensation reactor. After depressurization to atmospheric pressure, this mixture is kept for about 5 hours at 220° C. in the stream of nitrogen, with stirring at this temperature. A vacuum of 100 mbar was then applied within a period of 2 hours and maintained until the desired torque had been achieved. The melt was then subjected to a nitrogen pressure of 10 bar and discharged by means of a gear pump, and strand-pelletized. The pellets were dried at 80° C. under nitrogen for 24 hours.

Yield: 92 kg
The properties of the product were as follows:
Crystallite melting point $T_m$: 167° C.
Relative solution viscosity $\eta_{rel}$: 1.66
COOH end groups: 48 mmol/kg NH$_2$ end groups: 17 mmol/kg Example 2

To prepare a PEA based on PA12 having a hard block of 808 daltons and JEFFAMINE D400, the following starting materials were supplied to a 100 l double-tank polycondensation system—composed of mixing vessel with anchor stirrer and polycondensation reactor with helical stirrer:

1st charge:
46.473 kg of laurolactam,
18.527 kg of dodecanedioic acid, and
2nd charge
37.949 kg of JEFFAMINE D400,
100.0 g of a 50% strength aqueous solution of hypophosphorous acid (corresponds to 0.05% by weight).

The starting materials of the 1 st charge were melted in a nitrogen atmosphere at 180° C., injected into the polycondensation reactor, and heated, with stirring, to about 280° C. for 6 hours in the sealed autoclave. During this process, the 2nd charge was preheated to 180° C. in the mixing vessel and injected into the oligoamide dicarboxylic acid melt in the polycondensation reactor. After depressurization to atmospheric pressure, this mixture is kept for about 5 hours at 230° C. in the stream of nitrogen, with stirring at this temperature. A vacuum of 100 mbar was then applied within a period of 2 hours and maintained until the desired torque had been achieved. The melt was then subjected to a nitrogen pressure of 10 bar and discharged by means of a gear pump, and strand-pelletized. The pellets were dried at 80° C. under nitrogen for 24 hours.

Yield: 98 kg
The properties of the product were as follows:
Crystallite melting point Tm: 135° C.
Relative solution viscosity $\eta_{rel}$: 1.60
COOH end groups: 2 mmol/kg NH$_2$ end groups: 76 mmol/kg Example 3

To prepare a PEBA based on PA12 having a hard block of 2908 daltons and JEFFAMINE D2000, Example 1 was repeated with the following starting weights:
1st charge:
55.248 kg of laurolactam,
4.752 kg of dodecanedioic acid, and
2nd charge
42.503 kg of JEFFAMINE D2000,
101.0 g of a 50% strength aqueous solution of hypophosphorous acid (corresponding to 0.05% by weight).
Yield: 99 kg
The properties of the product were as follows:
Crystallite melting point $T_m$: 168° C.
Relative solution viscosity $\eta_{rel}$: 1.75
COOH end groups: 19 mmol/kg NH$_2$ end groups: 44 mmol/kg Example 4

To prepare a PEBA based on PA12 having a hard block of 1068 Daltons and JEFFAMINE D2000, Example 1 was repeated—in a 100 l double-tank system—with the following starting weights:
1st charge:
12.172 kg of laurolactam,
3.346 kg of dodecanedioic acid, and
2nd charge
28.430 kg of JEFFAMINE D2000,
44.0 g of a 50% strength aqueous solution of hypophosphorous acid (corresponding to 0.05% by weight).
Yield: 41 kg
The properties of the product were as follows:
Crystallite melting point Tm: 150° C.
Relative solution viscosity $\eta_{rel}$: 1.63
COOH end groups: 14 mmol/kg NH$_2$ end groups: 37 mmol/kg Example 5

To prepare a PEBA based on PA12 having a hard block of 1068 daltons and JEFFAMINE D2000, Example 4 was repeated—in a 200 l double-tank system—with the following starting weights:
1st charge:
27.453 kg of laurolactam,
7.547 kg of dodecanedioic acid, and
2nd charge
67.509 kg of JEFFAMINE D2000,
100.0 g of a 50% strength aqueous solution of hypophosphorous acid (corresponding to 0.05% by weight).
Yield: 91 kg
The properties of the product were as follows:
Crystallite melting point $T_m$: 151° C.
Relative solution viscosity $\eta_{rel}$: 1.63
COOH end groups: 14 mmol/kg NH$_2$ end groups: 37 mmol/kg Examples 6-8

To prepare a PEBA based on PA12 having a hard block of 1068 daltons and JEFFAMINE D2000, Example 5 was repeated with the following starting weights:

1st charge:

28.797 kg of laurolactam, 7.547 kg of dodecanedioic acid, and

2nd charge 67.509 kg of JEFFAMINE D2000, 100.0 g of a 50% strength aqueous solution of hypophosphorous acid (corresponding to 0.05% by weight).

TABLE 1

| Example | Yield kg | $T_m$ °C. | $\eta_{rel}$ | COOH mmol/kg | $NH_2$ mmol/kg |
|---|---|---|---|---|---|
| 6 | 95 | 152 | 1.73 | 54 | 9 |
| 7 | 92 | 153 | 1.60 | 11 | 42 |
| 8 | 97 | 153 | 1.60 | 13 | 47 |

Example 9

To prepare a PEBA based on PA12 having a hard block of 7225 daltons and JEFFAMINE D400, Example 2 was repeated—in a 100 l double-tank system—with the following starting weights:

1st charge:

43.566 kg of laurolactam, 1.434 kg of dodecanedioic acid, and

2nd charge 2.938 kg of JEFFAMINE D400, 47.0 g of a 50% strength aqueous solution of hypophosphorous acid (corresponding to 0.05% by weight).

Yield: 44 kg

The properties of the product were as follows:

Crystallite melting point $T_m$: 174° C.

Relative solution viscosity $\eta_{rel}$: 2.04

COOH end groups: 32 mmol/kg $NH_2$ end groups: 20 mmol/kg

Example 10

To prepare a PEBA based on PA12 having a hard block of 13 000 daltons and JEFFAMINE D2000, Example 9 was repeated with the following starting weights:

1st charge:

42.238 kg of laurolactam, 0.762 kg of dodecanedioic acid, and

2nd charge 6.814 kg of JEFFAMINE D2000, 50.0 g of a 50% strength aqueous solution of hypophosphorous acid (corresponding to 0.05% by weight).

Yield: 44 kg

The properties of the product were as follows:

Crystallite melting point $T_m$: 176° C.

Relative solution viscosity $\eta_{rel}$: 1.73

COOH end groups: 68 mmol/kg $NH_2$ end groups: 60 mmol/kg

Grinding of Pellets:

Grinding of the Comparative Examples 2-4 was markedly more difficult than that of the pellets of the present invention. For example, the temperature had to be lowered to −70° C. in order to obtain yields which were still below 50%. In the case of the materials of the present invention, 40° C. is sufficient to provide yields above 50%. The mill used is a HOSOKAWA ALPINE CONTRAPLEX 160 C pinned-disk mill.

All of the powders were sieved at 100 µm in order to ensure that excessively coarse particles could not disrupt the construction process. All of the powders were modified with 0.1 part of Aerosil 200.

TABLE 2

| | D10 µm | D50 µm | D90 µm | Bulk density g/l |
|---|---|---|---|---|
| Comparative Example 1: EOSINT PPA 2200 | 39 | 55 | 79 | 430 |
| Comparative Example 2: PEBA 1 | 30 | 70 | 126 | 361 |
| Comparative Example 3: PEBA 2 | 57 | 126 | 208 | |
| Comparative Example 4: PEBA 3 | 29 | 71 | 125 | 322 |
| Example 1 | 33 | 74 | 127 | 364 |
| Example 2 | 29 | 68 | 122 | 434 |
| Example 3 | 30 | 71 | 126 | 358 |
| Example 4 | 33 | 76 | 131 | 309 |
| Example 5 | 29 | 69 | 127 | 324 |
| Example 6 | 32 | 72 | 124 | 362 |
| Example 7 | 29 | 68 | 124 | 354 |
| Example 8 | 26 | 64 | 121 | 344 |
| Example 9 | 27 | 70 | 120 | 333 |
| Example 10 | 31 | 65 | 128 | 349 |

Processing:

All of the powders were used for construction in an EOSINT P360 from EOS GmbH, Krailling, Germany. This is a laser sintering machine. The construction chamber was preheated to a temperature close to the melting point of the respective specimen. The parameters for the laser, such as frequency and power, were matched in each case to the material via trials. The comparative materials were markedly more difficult to process, in particular in relation to absence of grooves during application of each powder layer.

As can be seen from the table below, the test specimens of the present invention exhibit marked advantages particularly in notched impact resistance at −30° C., as long as the density of the components can be set to a value above 0.9 g/mm³. If we compare Comparative Example 1 with Examples 9 and 10, although the parts are softer than parts composed of the reference material from Example 1, we nevertheless see a doubling of notched impact resistance and also an improvement in the other mechanical values. Consideration of Comparative Examples 2-4 and Examples 1-8 reveals marked improvements in particular in notched impact resistances at 30° C. In the case of components from Comparative Example 2, porosity is so high that corresponding use of the components becomes impossible.

TABLE 3

|  | Modulus of elasticity N/mm² | Tensile strength N/mm² | Tensile strain at break % | Notched impact RT kJ/m² | Notched impact −30 kJ/m² | Density g/mm³ |
|---|---|---|---|---|---|---|
| Comparative Example 1: EOSINT PPA 2200 | 1700 | 48 | 15 | 4.7 | 3.1 | 0.95 |
| Comparative Example 2: PEBA 1 | | no test specimens | | 31.7 | 64.9 | 0.8 |
| Comparative Example 3: PEBA 2 | 101 | 12.5 | 277 | 42.8 | 14.6 | 0.92 |
| Comparative Example 4: PEBA 3 | 220 | 15.4 | 25 | 7.3 | 4.0 | 0.82 |
| Example 1 | 138 | 13.8 | 64 | 29.3 | 23.1 | 0.9 |
| Example 2 | 173 | 11.7 | 38 | 43.7 | 1.8 | 0.82 |
| Example 3 | 165 | 13.8 | 38 | 21.2 | 6.5 | 0.85 |
| Example 4 | 77 | 6.6 | 48 | 22.4 | no fracture | 0.94 |
| Example 5 | 74 | 6.1 | 36 | 25.7 | no fracture | 0.92 |
| Example 6 | 90 | 6.6 | 30 | 30.5 | 42.3 | 0.97 |
| Example 7 | 91 | 7.6 | 52 | no fracture | no fracture | 0.82 |
| Example 8 | 81 | 7 | 46 | no fracture | no fracture | 0.82 |
| Example 9 | 1008 | 28.1 | 18 | 12.8 | 9.9 | 0.92 |
| Example 10 | 1222 | 32 | 16 | 9.2 | 7.8 | 0.93 |

German patent application 10 2005 008044.8 filed Feb. 19, 2005, and all patents and references mentioned herein are incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A polymer powder, comprising:
at least one block polyetheramide comprising an oligoamide dicarboxylic acid and a polyetheramine,
wherein said polyetheramine has a weight-average molar mass ranging from 200 to 5000 g/mol and comprises primary amino groups and a polyether backbone comprising at least one selected from the group consisting of propylene oxide, ethylene oxide, polytetramethylene oxide,
wherein said oligoamide dicarboxylic acid is selected from the group consisting of an oligoamide dicarboxylic acid obtained from laurolactam, an oligoamide dicarboxylic acid obtained from a lactam having at least 8 carbon atoms, from a ω-aminocarboxylic acid corresponding to an oligoamide dicarboxylic acid obtained from a lactam having at least 8 carbon atoms and from a dicarboxylic acid; and
wherein said powder is suitable for use in a layer-by-layer process in which regions of a powder layer are selectively melted via introduction of electromagnetic energy.

2. The polymer powder according to claim 1, comprising:
at least one block polyetheramide comprising an oligoamide dicarboxylic acid and a polyetherdiamine.

3. The polymer powder according to claim 1, wherein the ether units of said at least one block polyetheramide have alkyl branching.

4. The polymer powder according to claim 1, wherein said oligoamide dicarboxylic acid has a weight-average molar mass of from 1000 to 20 000 g/mol.

5. The polymer powder according to claim 1, wherein said oligoamide dicarboxylic acid has a weight-average molar mass below 1500 g/mol.

6. The polymer powder according to claim 1, wherein said polyetheramine has a weight-average molar mass of from 200 to 5000 g/mol.

7. The polymer powder according to claim 1, wherein the selectivity in said layer-by-layer process is achieved via application of a susceptor, an inhibitor, an absorber, or a mask.

8. The polymer powder according to claim 1, wherein the selectivity in said layer-by-layer process is achieved via focusing of a laser beam.

9. The polymer powder according to claim 1, wherein said block polyetheramide has been obtained via polycondensation.

10. The polymer powder according to claim 1, wherein said block polyetheramide powder has been obtained via grinding.

11. The polymer powder according to claim 10, wherein said block polyetheramide powder has been obtained via classification subsequent to the grinding process.

12. The polymer powder according to claim 1, wherein the number of amino end groups does not differ from that of carboxy end groups by more than 10%.

13. The polymer powder according to claim 1, which has an excess of amino end groups.

14. The polymer powder according to claim 1, which comprises a catalyst.

15. The polymer powder according to claim 1, which comprises phosphoric acid.

16. The polymer powder according to claim 1, wherein said block polyetheramide powder has a solution viscosity of from 1.4 to 2.1.

17. The polymer powder according to claim 1, wherein said block polyetheramide powder has a solution viscosity of from 1.5 to 1.9.

18. The polymer powder according to claim 1, wherein said block polyetheramide powder has a solution viscosity of from 1.6 to 1.8.

19. The polymer powder according to claim 1, wherein said block polyetheramide powder has an average grain diameter of from 40 to 120 μm.

20. The polymer powder according to claim 1, wherein said block polyetheramide powder has a BET surface area smaller than 5 m²/g.

21. The polymer powder according to claim 1, wherein said block polyetheramide powder has a melting point of from 140° C. to 200° C.

22. The polymer powder according to claim 1, wherein said block polyetheramide powder has a recrystallization temperature of from 50° C. to 190° C.

23. The polymer powder according to claim 1, comprising an auxiliary and/or a filler.

24. The polymer powder according to claim 23, comprising a powder-flow aid as auxiliary.

25. The polymer powder according to claim 23, comprising glass particles as filler.

26. The polymer powder according to claim 1, comprising an organic pigment and/or an inorganic pigment.

27. The polymer powder according to claim 1, comprising carbon black.

28. The polymer powder according to claim 1, comprising titanium dioxide.

29. A process for production of a molding, comprising:
via a layer-by-layer process selectively melting regions of a respective powder layer of a powder by introduction of electromagnetic energy,
wherein the selectivity is achieved via application of a susceptor, an inhibitor, an absorber, or a mask,
wherein said powder comprises
at least one block polyetheramide comprising an oligoamide dicarboxylic acid and a polyetheramine,
wherein said polyetheramine has a weight-average molar mass ranging from 200 to 5000 g/mol and comprises primary amino groups and a polyether backbone comprising at least one selected from the group consisting of propylene oxide, ethylene oxide. polytetramethylene oxide,
wherein said oligoamide dicarboxylic acid is selected from the group consisting of an oligoamide dicarboxylic acid obtained from laurolactam, an oligoamide dicarboxylic acid obtained from a lactam having at least 8 carbon atoms, from a ω-aminocarboxylic acid corresponding to an oligoamide dicarboxylic acid obtained from a lactam having at least 8 carbon atoms and from a dicarboxylic acid.

30. The process according to claim 29, wherein said powder comprises at least one block polyetheramide comprising an oligoamide dicarboxylic acid and a polyetherdiamine.

31. The process according to claim 29, wherein the selectivity is achieved via focusing of a laser beam.

32. The process according to claim 29, wherein the selectivity is achieved via focusing of a laser beam; and wherein said powder comprises
at least one block polyetheramide comprising an oligoamide dicarboxylic acid and a polyetherdiamine.

33. A molding, produced according to the process of claim 29.

34. The molding according to claim 33, wherein said powder comprises at least one block polyetheramide comprising an oligoamide dicarboxylic acid and a polyetherdiamine.

35. The molding according to claim 33, wherein said powder comprises block polyetheramide obtained via polycondensation of oligoamide dicarboxylic acid having a weight-average molar mass of from 1000 to 20 000 g/mol and polyetherdiamine.

36. The molding according to claim 33, wherein said powder comprises block polyetheramide obtained via polycondensation of oligoamide dicarboxylic acid and polyetherdiamine having a weight-average molar mass of from 200 to 5000 g/mol.

37. The molding according to claim 33, wherein said powder comprises a block polyetheramide with a solution viscosity of from 1.4 to 2.1.

38. The molding according to claim 33, wherein said powder comprises a block polyetheramide with a solution viscosity of from 1.5 to 1.9.

39. The molding according to claim 33, wherein said powder comprises a block polyetheramide with a solution viscosity of from 1.6 to 1.8.

40. The molding according to claim 33, wherein said powder comprises an auxiliary and/or a filler.

41. The molding according to claim 33, wherein said powder comprises a powder-flow aid as auxiliary.

42. The molding according to claim 33, wherein said powder comprises glass particles as filler.

43. The molding according to claim 33, wherein said powder comprises an organic pigment and/or an inorganic pigment.

44. The molding according to claim 33, wherein said powder comprises carbon black.

45. The molding according to claim 33, wherein said powder comprises titanium dioxide.

46. The molding according to claim 33, which has a notched impact resistance to DIN EN ISO 179 1 eA at room temperature of more than 15 kJ/m$^2$.

47. The molding according to claim 33, which has a notched impact resistance to DIN EN ISO 179 1 eA at 30°C. of more than 15 kJ/m$^2$.

* * * * *